United States Patent [19]

Blesch et al.

[11] 3,763,434
[45] Oct. 2, 1973

[54] BATTERY CONNECTING STRUCTURE FOR PORTABLE DEVICE

[75] Inventors: Robert Blesch; Robert M. Galton, both of Ft. Lauderdale, Fla.

[73] Assignee: Motorola, Inc., Franklin Park, Ill.

[22] Filed: Mar. 2, 1972

[21] Appl. No.: 231,260

[52] U.S. Cl. .................. 325/352, 325/16, 325/356
[51] Int. Cl. ............................................ H04b 1/08
[58] Field of Search .................... 320/27, 30, 56; 325/15, 16, 111, 118, 119, 352, 356, 361, 362; 343/702

[56] References Cited
UNITED STATES PATENTS

| | | | |
|---|---|---|---|
| 3,345,568 | 10/1967 | Errichiello et al. | 325/16 |
| 2,921,267 | 1/1960 | Thomas | 325/362 |
| 3,701,016 | 10/1972 | Bennett | 325/16 |

Primary Examiner—Albert J. Mayer
Attorney—Foorman L. Mueller et al.

[57] ABSTRACT

Battery operated portable device having one-piece conductors for connecting the device to a rechargeable battery, with external contact portions for engaging charging contacts to permit charging while the battery is within the housing of the device. The conductors provide connections from the device to a single use battery, but do not provide connections for charging such battery, to thereby prevent damage by accidental charging. The conductor structure provides the charging connection through a diode to prevent discharge of the battery by shorting the external contact portions. A connection is provided to a control terminal of the battery, in addition to the energizing terminals. The conductors are single flat strips having a resilient portion for engaging a contact of the battery, an integral contact for engaging the charger contact and an integral tab for connection to the energized device.

14 Claims, 7 Drawing Figures

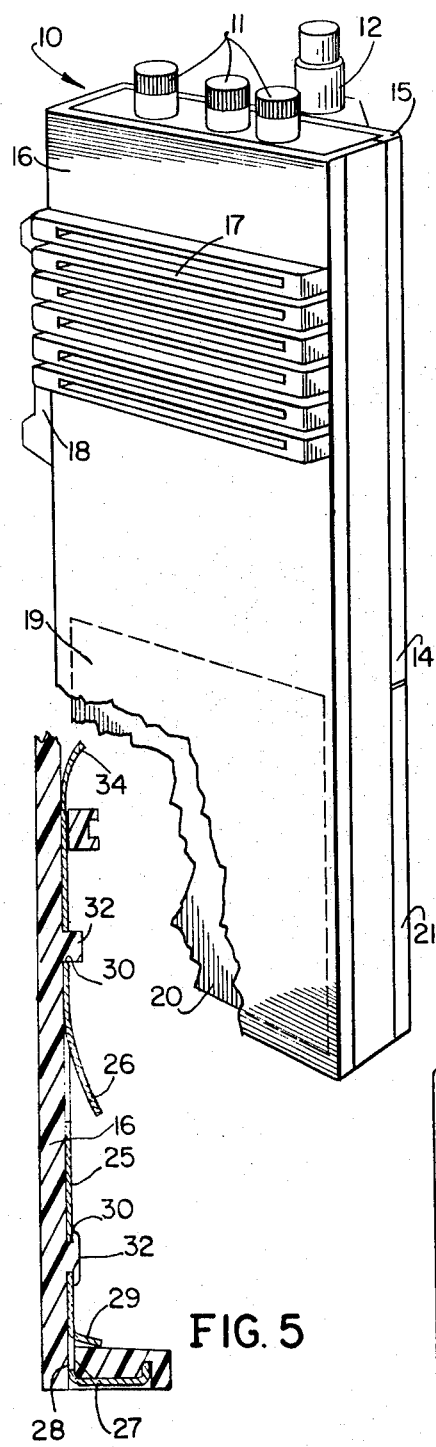
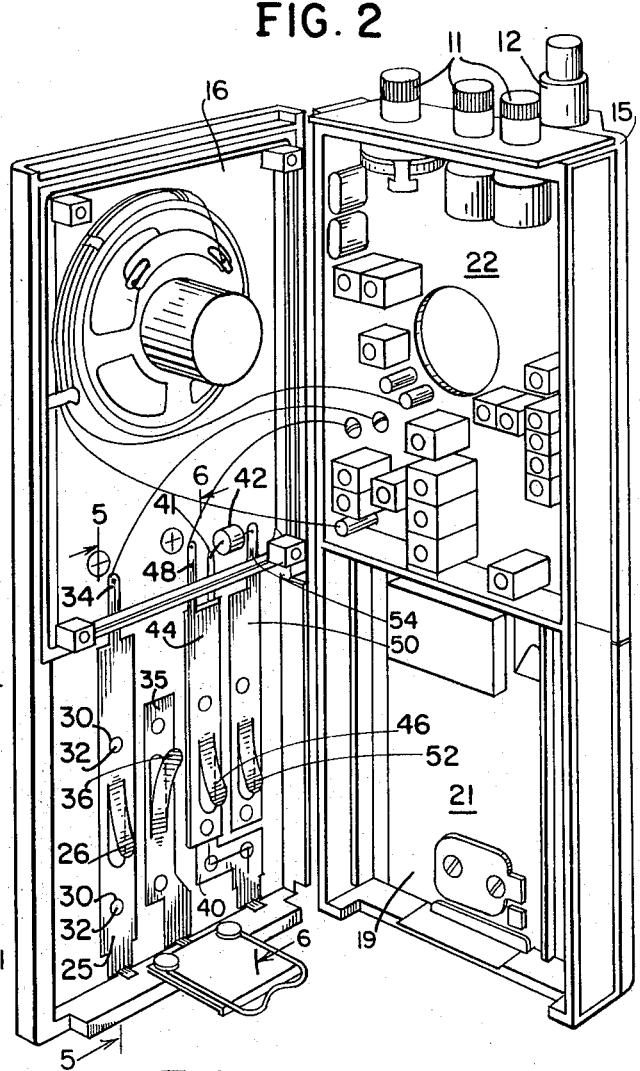
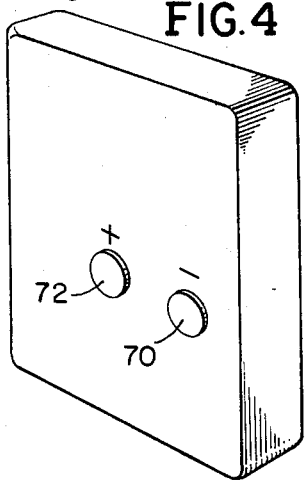
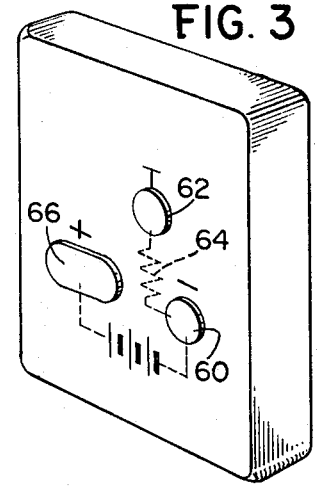

Patented Oct. 2, 1973

BATTERY CONNECTING STRUCTURE FOR PORTABLE DEVICE

BACKGROUND OF THE INVENTION

Reference is made to U.S. Pat. No. 3,345,568, issued Oct. 3, 1967, to Dominic Errichiello, Philip J. Hansen and Norman P. Alexander, entitled, Transistorized Portable Radio Transmitter-Receiver Structure, which is assigned to Motorola, Inc., the assignee of the present application. This patent shows a radio transmitter-receiver with conductor arranged for charging a rechargeable battery within the housing, and to prevent charging a single use battery.

Small battery powered devices such as a hand held radio transmitter and/or receiver may be energized by self-contained batteries, which may be rechargeable batteries, such as nickel-cadmium batteries or single use batteries, such as mercury batteries. For ease of charging the battery, external contacts may be provided on the deivce which are connected to the battery terminals for charging the battery while within the device. It is important, however, to provide connections which will not connect the single use batteries to the external charging contacts, as such batteries may be damaged by charging and may produce a dangerous condition in the battery and in the device in which it is used. It is therefore desired to provide a connecting arrangement which will make the required connections to the device and to the charging contacts thereon when used with a rechargeable battery, and which does not make connections to the charging contacts when a single use battery is provided therein.

The above referred to patent describes a structure which has been quite successfully used for the purpose which has been set forth. However, in this structure, the conducting strips which engage the battery are connected to separate contacts provided in openings in the housing. The holes provided in the housing for receiving the contacts produce stresses in the plastic housing which may cause cracks therein. Also, the connection between the contacts and the conducting strips has been subject to galvanic corrosion which may cause intermittent circuit operations. Further, in prior structures there has been the possibility that the charging contacts which extend to the outside of the housing may become shorted to discharge the battery.

SUMMARY OF THE INVENTION

It is an object of the present invention to provide an improved connecting arrangement for portable apparatus having a self-contained battery to facilitate charging of a rechargeable battery while in the housing, and to prevent charging of a single use battery therein.

Another object is to provide battery charging connections for portable apparatus having one-piece conductors with resilient portions for engaging contacts of the battery and integral contact portions extending outside the housing for making connections from the battery to a charger.

Another object of the invention is to provide a conductor arrangement for making connections from a battery to apparatus energized thereby and to charging contacts, which prevents discharging of the battery upon shorting of the charging contact.

A still further object of the invention is to provide a contact arrangement for a portable battery operated device formed by one-piece battery connecting conductors which are secured to a plastic wall of the housing of the device and extend through recesses therein to provide charger connecting portions outside the housing.

In practicing the invention. conductor strips are secured to a wall of a battery compartment of a housing of a battery energized device, and have integral resilient portions for engaging contacts of a battery in such compartment. The conductor strips also have integral terminal portions which extend through slits in the housing wall to form charging contacts on the outside surface of the housing. The connectors have openings which extend over bosses in the plastic housing wall, with the ends of the bosses being formed over as by ultrasonic staking to secure the conductors to the housing. The external contact portions fit in recesses and are held in position by projecting portions thereon which engage the housing wall. One conductor having a charging contact may be insulated from a second overlying conductor for energizing the device, and may be connected through a diode to a third conductor, with the second and third conductors being connected to the battery contact of a rechargeable battery positioned in the battery compartment. This provides charging of the battery through the diode, but prevents discharge of the battery when the charging contacts are shorted. An additional conducting strip has a resilient portion for connection to a control terminal of the battery and has an external contact for connection to a control terminal to the charger. The conductor arrangement provides for charging a rechargeable battery while positioned in the battery compartment, and permits use of a nonrechargeable battery and provides energizing connections therefrom, but does not connect the same to the charging contact so that it might be accidentally charged.

BRIEF DESCRIPTION OF THE DRAWING

FIG. 1 shows a portable radio transmitter-receiver which contains a battery for energizing the same;

FIG. 2 illustrates the conductor arrangement for connection to the battery of the radio transmitter-receiver of FIG. 1;

FIG. 3 illustrates a rechargeable battery for use in the device of FIGS. 1 and 2;

FIG. 4 illustrates a single use battery for use in the device of FIGS. 1 and 2;

FIG. 5 is a cross-sectional view along the lines 5—5 of FIG. 2;

DETAILED DESCRIPTION

Figure 6:
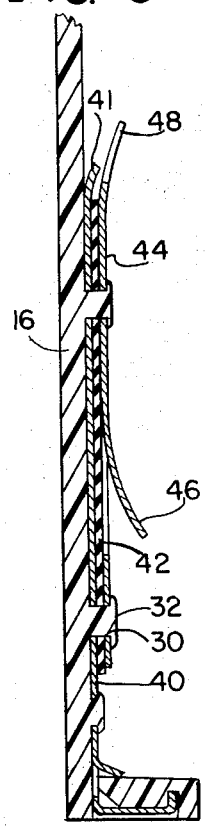
FIG. 6 is a cross-sectional view along the lines 6—6 of FIG. 2.

Referring now to the drawings, FIG. 1 shows a miniature hand held radio transmitter-receiver. This may be generally of the configuration shown in the Errichiello et al. U.S. Pat. No. 3,345,568, referred to above. The housing 10 has controls 11 at the top and a telescoping antenna 12 provided in the upper part 15 of a back cover 14. On the front cover 16 is a raised portion 17 having openings therein through which sound may pass to a microphone-speaker unit provided within the housing. On the left side of the housing is a push-to-talk switch 18. In the bottom part of the housing is a battery compartment 19 within which a battery 20 is positioned. The battery may be removed from the housing by removal of the bottom portion 21 of the back cover.

FIG. 2 shows the front cover 16 of the housing open to expose the chassis 22 of the radio transmitter-receiver within the top portion of the housing, and showing the battery compartment 19 without a battery therein. This shows a plurality of conductors having contacts for engaging terminals of a battery when it is positioned within the compartment. The conductor arrangement is adapted to make connections to a rechargeable battery as illustrated in FIG. 3, and to a single use battery as illustrated in FIG. 4.

Considering now the conductor structure, a first conductor 25 is formed by a flat strip of conducting material having a punched out portion 26 which forms a resilient contact. The strip has an end portion 27 as shown in FIG. 5 which extends through an opening 28 in the front cover 16 to provide a contact at the bottom of the transmitter-receiver housing. The end 27 is shaped to be fed into the slot 28, and is received in a recess in the bottom of cover 16. In this position, the bent out projection 29 of strip 25 engages the inner surface of the bottom of the front cover 16 of the housing. Openings 30 in the conducting strip 25 receive bosses 32 projecting from the housing wall. The ends of the bosses 32 are then formed over the strip, as by ultrasonic riveting or staking, to hold the conducting strip 25 in position against the housing wall. In FIG. 5, the lower boss 32 is shown staked over the strip 25 to hold the same against the front cover 16. At the upper end of the strip is an integral tab 34 to which a connection can be made to the energized device, which in this case is the chassis 22 of the radio transmitter-receiver.

The next conducting strip 35 is generally similar to the conducting strip 25 and includes a resilient battery engaging portion 36. The bottom end, which extends through the bottom of the housing, is offset somewhat so that the contact portion thereof is spaced from the contact portion 27 of the strip 25. The strip 35 is not connected to the radio circuit and therefore does not extend up into the upper part of the housing.

The conducting strip 40 is also generally similar to the conducting strip 25, except that it does not include a resilient battery contact portion. The lower end of the strip, which extends through the bottom wall of the front cover of the housing, it offset to space the same from the contact portion of the strip 35. The upper end of the strip has a tab 41 for making a circuit connection thereto. Overlying the strip 40 is a second conducting strip 44 which is separated from the strip 40 by an insulating sheet 42. This structure is shown in FIG. 6, which is a cross-sectional view showing the strip 40, the insulating sheet 42 thereon and the conducting strip 44 above the insulating sheet. The conducting strips 40 and 44 both have openings 30 through which bosses 32 on the molded front plate extend, and which are staked over as described in connection with the bosses 32 in FIG. 5. The upper strip 44 has a punched out resilient contact 46 for engaging a battery terminal. This strip also has an integral tab 48 for making a connection to the chassis 22.

To the right of the conducting strips 40 and 44 is another conducting strip 50. This has a resilient portion 52 for engaging a contact of the battery, and a tab 54 to which a circuit connection can be made. The conducting strip 50 does not include a portion which extends through the bottom wall of the front cover. A diode 42 is connected between the tab 41 on strip 40 and the tab 54 on strip 50.

Considering now the connections provided by the conducting strips, when a battery as illustrated in FIG. 3 is positioned in the battery compartment, a connection is made to the negative terminal 60 of the battery by the resilient contact portion 26 of the conductor 25. This provides a connection from the negative terminal of the battery to the negative energizing conductor of the radio chassis 22, and also to the contact portion 27 at the bottom of the housing (FIG. 5) for providing a charging connection to the negative terminal 60 of the battery. The battery terminal 62, which is a control terminal connected to a thermistor 64 provided within the battery, is engaged by the resilient contact 36 of the conducting strip 35. The larger battery contact 66, which is connected to the positive terminal of the battery, is engaged by the resilient contact portion 46 of conducting strip 44 and by the contact portion 52 of the strip 50. The strip 44 provides a connection through tab 48 to the positive supply terminal of the chassis so that the battery is connected to the energizing terminals of the battery for energizing the radio circuits thereof.

The positive battery terminal 66 is also connected through conducting strip 50 and through diode 42 to the conducting strip 40. Accordingly, the external contact portion of strip 40 provides a circuit connection through the strip 40, diode 42 and strip 50 to the positive terminal for charging the battery. However, this circuit does not permit the flow of current from the battery to the external charging terminal for discharging the battery in the event that the contact strips 25 and 40 are shorted by some conductor which engages the external contact portions thereof.

In the event that a single use battery as shown in FIG. 4 is used in the radio transmitter-receiver, the negative contact 70 thereof engages the resilient contact 26 of the conductor 25. This connection extends through the tab 34 to the negative energizing circuit for the radio chassis 22. The positive terminal 72 of the battery is connected by the resilient contact 46 of conducting strip 44 and through tab 48 to the positive energizing conductor for the radio chassis 22. Accordingly, the battery provides the required energization of the radio transmitter-receiver. However, the positive terminal 72 of the battery is not of a size to be engaged by resilient contact 52 of strip 50. Therefore, if the radio is placed in a charger, although a connection is made to the negative terminal 70 through contact portion 27 of conducting strip 25, the conducting strip 40, which is connected to the positive terminal of the charger, is not connected to the battery.

Figure 7:
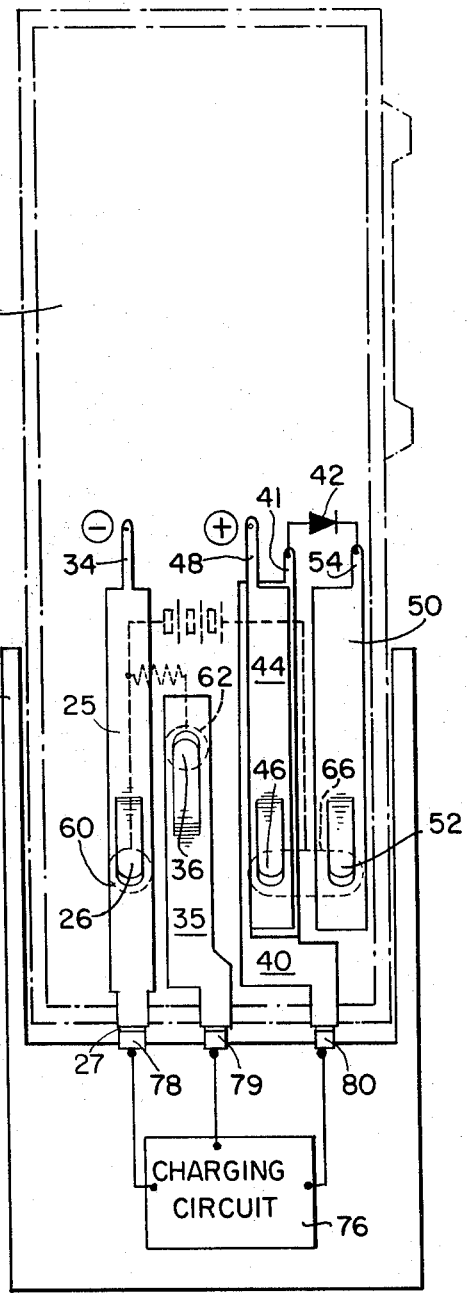
FIG. 7 is a schematic diagram illustrating the charging connections made through the conductor arrangement of the invention.

FIG. 7 shows schematically the circuit connections provided when the radio transmitter-receiver device 10 is placed in a charger 75. The charger includes a circuit 76 which is connected to three terminals 78, 79 and 80. The charger circuit may be of a construction as described in patent application Ser. No. 94,261, filed Dec. 2, 1970, by Henry A. Bogut and Leon Jasinski.

When the radio is placed in the charger, the contact portion 27 of conducting strip 25 engages the charger terminal 78. The charger terminal 78 may be of a resilient construction to provide a good connection with contact portion 27 when engaged thereby. The weight of the radio device holds the contact portion 27 against contact 78. The external contact of strip 35 engages terminal 79 of the charger, and the contact portion of strip 40 engages terminal 80 of the charger. The terminals 79 and 80 may also be resilient to provide good connections, as has been previously described. Accordingly, the charger is connected through terminal 78 thereof to the negative terminal 60 of the battery through the conducting strip 25, and is connected through terminal 80 thereof to the positive terminal 66 of the battery through conducting strip 40, diode 41 and conducting strip 50. The conductring strip 35 is connected through resilient contact 36 thereof to the control terminal 62 of the battery, which may be connected to a thermistor in the battery to give an indication of the battery termperature. This connection is completed through the contact portion of conducting strip 35 to the terminal 79 of the charger.

The conductor arrangement for making connections to a battery in the housing of a portable device has been found to be highly effective to provide charging of a rechargeable battery and to prevent charging of a single use battery, while the battery is in the housing, by connection to contacts on the exterior of the housing. The arrangement also prevents discharge of the battery by accidental shorting of the external charging contacts. The conecting structure is simple and inexpensive using integral one-piece conductors which have no joints or connections which can create a problem. Further, the use of flat strips requires very little housing space for the connecting structure.

We claim:

1. A portable battery operated device including in combination, a housing having a battery compartment therein, conductor means for connecting a battery within the housing to apparatus in the housing to be energized thereby, said conductor means including first and second unitary conductors each having an integral resilient portion within said battery compartment for engaging terminals of the battery, said housing having openings therein extending from said battery compartment to the outside of said housing, and said first and second conductors each having an integral contact portion extending through one of said openings in said housing and having an integral part thereof forming a contact on the outside surface of said housing for making an external electrical connection thereto.

2. A portable battery operated device in accordance with claim 1 wherein said conductor means includes a third unitary conductor having an integral contact portion extending through an opening in said housing and having an integral part thereof forming a contact on the outside surface thereof, and a fourth conductor having a resilient portion for engaging a terminal of the battery, and including rectifier means connecting said third conductor to said fourth conductor.

3. A device in accordance with claim 2 wherein said conductor means includes a fifth conductor having an integral resilient portion for engaging the same terminal of the battery which is engaged by said resilient portion of said fourth conductor, said first and fifth conductors having integral connecting portions for providing energizing connections to the apparatus to be energized.

4. A device in accordance with claim 3 wherein said fifth conductor is positioned over said third conductor, and including an insulating layer positioned between said third and fifth conductors.

5. A device in accordance with claim 1 wherein said first and second conductors are formed of flat strips having openings therein and said housing includes a portion formed of plastic having bosses molded thereon, with said conductors positioned with said openings therein about said bosses and said bosses having ends staked to hold said conductors on said plastic housing portion.

6. A device in accordance with claim 1 wherein said first and second conductors are formed as flat strips and said contact portions thereof extend at right angle to said strips, and wherein said openings in said housing are slots for receiving said strips, and said housing has recesses adjacent said openings for receiving said right angle portions.

7. A device in accordance with claim 6 wherein said right angle portions have inturned ends, and said recesses are shaped to receive said inturned ends, and wherein said conductors have bent out portions engaging the inside surface of said housing adjacent said right angle portions.

8. A portable battery operated radio device including in combination, a housing having a battery compartment therein, conductor means for connecting a battery with the housing to a radio chassis in the housing to be energized thereby, said conductor means including at least one flat strip conductor having an integral resilient portion for engaging a battery terminal and an integral connecting portion on one end thereof for connection to the radio chassis, said housing having an opening therein extending from said battery compartment to the outside of said housing, and said flat conductor having an integral contact portion on the end thereof opposite to said one end extending through said opening and having an integral part thereof forming a contact on the outside surface of said housing.

9. A device in accordance with claim 8 wherein said opening in said housing is a slot through which said conductor extends, said opposite end of said flat conductor has a portion extending at right angles, and said housing has a recess along the outside surface thereof for receiving said right angle portion.

10. A portable radio device operated from a self-contained battery including in combination:

a housing having a radio chassis therein and a battery compartment;

first, second, third and fourth elongated flat strip conductors positioned along an inside wall of said battery compartment;

said first conductor having an integral resilient portion intermediate the ends for engaging a terminal of a battery within said compartment, an integral extension at one end for connection to said radio chassis and an integral contact portion at the opposite end, said housing having a plurality of openings therein extending from said battery compartment to the outside of said housing, and said contact portion extending through one of said openings to the outside of said housing and having an integral part thereof forming a charging contact on the outside of said housing;

said second conductor having an integral resilient portion for engaging a terminal of the battery and an integral extension at one end for connection to said radio chassis;

said third conductor having an integral connecting portion at one end and an integral contact portion at the opposite end, said contact portion of said third conductor extending through one of said openings to the outside of said housing and having an integral part thereof forming a charging contact on the outside of said housing;

said fourth conductor having an integral resilient portion for engaging a terminal of the battery and an integral connecting portion at one end;

rectifier means connecting said integral connecting portions of said third and fourth conductors;

said resilient portions of said conductors being arranged to engage terminals of a rechargeable battery positioned in said compartment to connect the same to said radio chassis and to said charging contacts for charging such battery while within said housing; and said resilient portions of said conductors being arranged to engage terminals of a single use disposable battery positioned in said compartment to connect the same to said radio chassis, with said contact portion of said fourth conductor being insulated from the terminals of the single use battery to isolate the same from said charging contacts.

11. A device in accordance with claim 10 wherein said battery compartment of said housing adjacent said conductors is formed of plastic material having bosses molded thereon, and said conductors have openings therein positioned to receive said bosses therein, with said bosses having ends which are enlarged to hold said conductors in position in said battery compartment.

12. A device in accordance with claim 10 including a fifth elongated flat strip conductor positioned along an inside wall of said battery compartment, said fifth conductor having an integral resilient portion for engaging a terminal of a battery and an integral contact portion, and wherein said housing has a further opening therein extending from said battery compartment to the outside of said housing, and said contact portion extends through said further opening and has an integral part thereof forming a contact on the outside of said housing.

13. A device in accordance with claim 12 wherein said contact portions of said first, third and fifth conductors extend at right angles to said elongated flat strip conductors, and said housing has recesses adjacent said openings therein for receiving said right angle portions.

14. A device in accordance with claim 13 wherein said right angle portions of said conductors have inturned ends and said recesses are shaped to receive said inturned ends, and wherein said conductors have bent out portions engaging the inside surface of said housing adjacent said right angle portions thereof.

* * * * *